March 4, 1947.    E. J. KAISER ET AL    2,416,697
TELESCOPE
Filed March 24, 1943    2 Sheets-Sheet 1
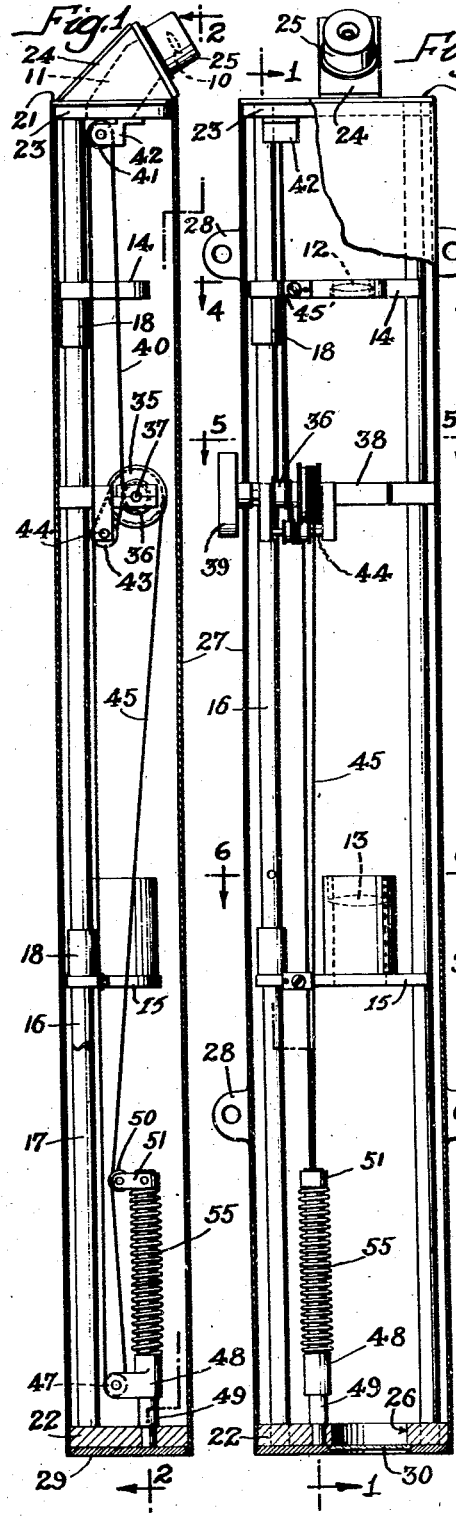
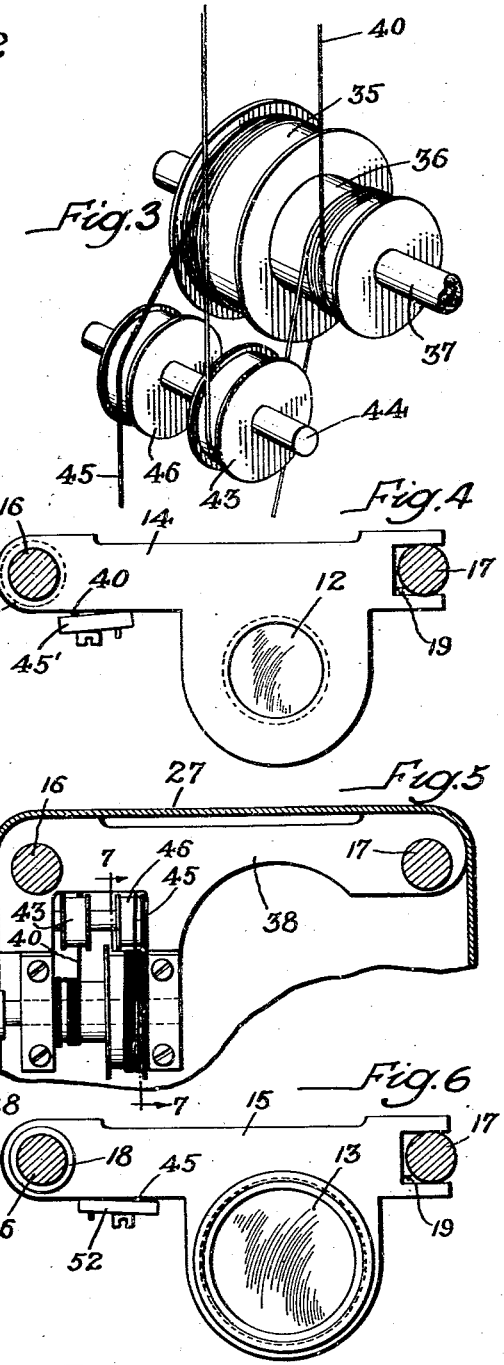
INVENTORS
Erwin J. Kaiser
Joseph Dauber
By Parker, Carlson, Pitney + Hubbard
ATTORNEYS

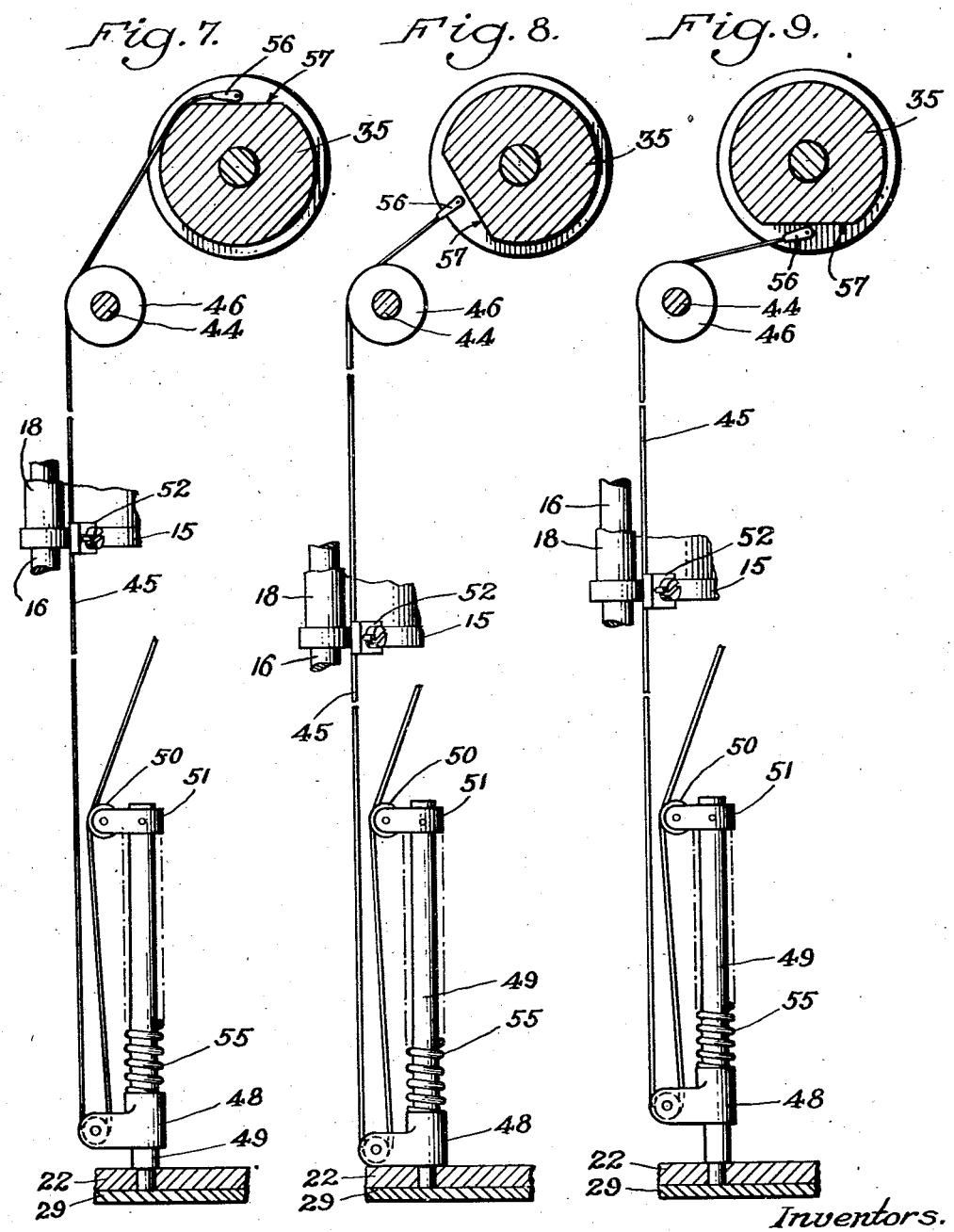

Patented Mar. 4, 1947

2,416,697

UNITED STATES PATENT OFFICE 2,416,697

TELESCOPE

Erwin J. Kaiser, Fond du Lac, Wis., and Joseph Dauber, Chicago, Ill., assignors to Giddings & Lewis Machine Tool Co., Fond du Lac, Wis., a corporation of Wisconsin Application March 24, 1943, Serial No. 480,318

7 Claims. (Cl. 88—32)

The invention relates to improvements in telescopes and the focusing mechanism therefor.

One object of the invention is to provide an improved telescope in which the image remains substantially the same size as the distance of the object from the telescope increases and in which the object field also remains substantially constant so that relatively fine markings such as those on a vernier scale can be easily and accurately read at varying distances.

Another object is to provide improved focusing mechanism for telescopes of the above general character operative to shift two or more optical elements along the optical axis of the telescope in predetermined relationship to progressively vary the focal length of the combined elements while maintaining the image field in substantially fixed relation with reference to the eyepiece of the telescope.

Still another object is to provide a simple compact telescope construction in which the optical elements and associated parts, including the focusing mechanism, are assembled on a rigid frame as a unitary structure and in which the complete assembly is enclosed in and protected by a rugged housing adapted to be attached to a machine tool or other structure with which the telescope is to be used.

Other objects and advantages of the invention will become apparent from the following detailed description of the preferred embodiment, in which:

Fig. 1 is a longitudinal sectional view of the improved telescope taken in a vertical plane substantially on the line 1—1 of Fig. 2.

Fig. 2 is a sectional view taken in a vertical plane substantially on the line 2—2 of Fig. 1.

Fig. 3 is a perspective view of a part of the focusing mechanism.

Figs. 4, 5 and 6 are sectional views taken respectively in horizontal planes substantially on the lines 4—4, 5—5 and 6—6 of Fig. 2.

Fig. 7 is a view of the focusing mechanism in diagrammatic form but with a portion shown in section substantially on the line 7—7 of Fig. 5.

Fig. 8 is a view similar to Fig. 7 but showing the elements of the focusing mechanism in another position of adjustment.

Fig. 9 is a view similar to Figs. 7 and 8, but showing the elements of the focusing mechanism in still another position of adjustment.

While we have shown and will describe herein a preferred form of the telescope and the improved focusing mechanism incorporated therein, it is to be understood that we do not thereby intend to limit the invention to the specific form disclosed but intend to cover all modifications, adaptations and alternative constructions falling within the spirit and scope of the invention as expressed by the appended claims.

By way of illustration, the invention has been shown in a form most suitable for visual observation of measuring devices such as vernier scales commonly provided on machine tools for measuring and indicating the position of a movable machine tool element with respect to its supporting structure. A measuring and indicating system of this general character is disclosed and claimed in the copending application of Raymond M. Woytych and Erwin J. Kaiser, Ser. No. 480,296, filed March 24, 1943.

In the preferred form illustrated, the improved telescope comprises an ocular system or eyepiece 10 of any suitable character optically associated through a conventional erecting prism 11 with a double objective comprising optical elements 12 and 13. The elements 12 and 13, herein shown in conventional form, are preferably achromatized and are supported in any suitable manner for movement along their common optical axis toward or from the eyepiece 10. To this end the elements are mounted in carriers 14 and 15 slidably supported and guided by a pair of parallel guide rods 16 and 17. Each of the carriers is provided at one end with a rigid sleeve-like bearing member 18 adapted to receive the guide rods 16 with a snug sliding fit and the opposite end is notched as at 19 to straddle the companion guide rod 17. In this way the carriers and the optical elements supported thereby are held securely in accurate alinement and yet permitted to move freely along the optical axis of the elements.

The guide rods 16 and 17 are anchored at their upper and lower ends in top and bottom members 21 and 22 to form therewith a rigid, unitary frame structure. As herein shown, the top member 21 comprises a generally rectangular plate having a depending flange 23 around its marginal edge but inset therefrom as shown in Figs. 1 and 2. A triangular casing 24, mounted on the top member, encloses the prism 11 and supports a detachable barrel 25 in which the eyepiece 10 is suitably mounted. In the present instance the eyepiece is positioned at an angle of approximately 45 degrees to the optical axis of the objective elements for convenient viewing from the side of the instrument. The prism 11 acts to bend the light rays from the objective the correct amount for viewing through the angularly disposed eyepiece and in addition serves to erect the image.

The bottom member 22 of the frame assembly comprises a flat generally rectangular plate having substantially the same dimensions as the flange portion 23 of the top member. The plate is formed with a generally circular opening 26 of substantial diameter alined on the optical axis of the objective elements for viewing purposes.

The frame assembly and parts carried thereby are enclosed in a rugged housing 27 having laterally projecting lugs 28 at each side for attachment to a machine part or other structure with which the telescope is to be used. The housing is of rectangular cross section and is dimensioned to receive the bottom member 22 and the flange portion 23 of the top member which may be secured thereto by screws or other suitable means. The frame and other parts of the telescope may therefore be inserted in or removed from the housing as a unit. As herein shown, the lower end of the housing is closed by a cover plate 29 having an opening alined with the opening 26 in the bottom member and fitted with a glass cover or window 30 to exclude dirt and moisture from the interior of the housing.

Focusing mechanism of a novel and advantageous character is provided for imparting differential movement to the optical elements 12 and 13 of the objective so as to progressively vary the focal length of the lens combination while maintaining the image plane at the same point, that is, in proper focal relation to the eyepiece 10. By varying the focal length of the system in this manner, the object field is maintained substantially constant and magnification increases progressively as the distance from the object increases so that the observed image is approximately the same size for either close up or remote objects. This is highly advantageous in reading the markings of precision scales or verniers.

The focusing mechanism includes a manually operable differentially acting driver adapted to shift the lens carriers 14 and 15 at predetermined different rates as required by the optical characteristics of the objective elements 12 and 13. By way of example, a telescope for viewing objects within a range of from two to seventeen feet is provided with an upper objective element 12 of approximately 128 millimeters focal length and a lower objective element 13 of approximately 550 millimeters focal length and the focusing mechanism is arranged to shift the lower objective through a range substantially doubly that of the upper objective. The ratios required for objective elements of other focal lengths may be readily calculated by well-known optical laws.

The differentially acting driver of the exemplary focusing mechanism, as herein shown, comprises a large diameter drum 35 and a smaller diameter drum 36 fixed on a common shaft 37 disposed transversely of the optical axis of the elements. The shaft is journaled on a bracket 38 stationarily supported on the guide bars 16 and 17 intermediate the two lens carriers as shown in Figs. 1 and 2. One end of the shaft is arranged to project from the side of the housing 27 and is equipped with a knob 39 by which it can be rotated manually.

A cord or flexible cable 40 anchored at both ends to the small diameter drum 36 is wound around the pulley several turns, then led over a guide pulley 41 journaled on a bracket 42 secured to the top member 21 of the frame structure and over a second guide pulley 43 loosely mounted on a shaft 44 carried on the bracket 38 below and at one side of the shaft 37. The guide pulleys are positioned so as to direct one run of the cord in a substantially straight line parallel to the guide rods 16 and 17. Within this straight section, the cable is adjustably secured to the lens carrier 14 by means of a screw clamp 45' or the like. The cable is wound around the drum in a manner such that rotation of the shaft 37 and drum 36 in a counterclockwise direction (as viewed in Fig. 3) is effective to pull the carrier 14 upwardly while rotation of the drum in the opposite direction pulls the carrier downwardly.

Simultaneous shifting of the lower carrier 15 is effected by a second cable 45 anchored at both ends to the large diameter drum 35 and operatively connected with the carrier. The cable is wound around the drum a plurality of turns and then led over a guide pulley 46 loosely mounted on the shaft 44 and over a second guide pulley 47 journaled on a bracket 48 yieldably mounted on a post 49 upstanding from the bottom member 22 of the frame structure. Between the pulley 47 and the drum 35, one run of the cable is led over a third guide pulley 50 journaled in a bracket 51 fast on the top of the post 49. The pulley 50 thus serves to hold the cable clear of the post at all times. Pulleys 46 and 47 direct the inner run of the cable in a straight line parallel to the guide rods 16 and 17 and within this run the cable is adjustably anchored to the carrier 15 as by a screw clamp 52.

The cable 45 is wound on the drum 35 in a direction such that rotation of the shaft 37 in a counterclockwise direction (as viewed in Fig. 3) is normally effective to shift the carrier 15 downwardly, that is, in a direction opposite to the direction of movement imparted to the upper carrier in response to such rotation of the shaft. Moreover, the lower carrier 15 is shifted through substantially twice the distance of the upper carrier 14 in response to rotation of the focusing shaft through a definite angle. Accordingly, rotation of the focusing shaft in a counterclockwise direction as above described, is effective to increase the focal length of the lens combination by shifting the upper objective toward the eyepiece at a predetermined rate while shifting the lower objective away from the eyepiece at a predetermined greater rate. As a result, the focusing of the telescope upon a distant object automatically positions the objective elements of the telescope so as to produce the maximum magnification at the longer focal length and to maintain a substantially constant object field at all focal lengths.

The driver or carrier shifting mechanism above described, is further arranged so that the downward movement of the lower carrier 15 is gradually retarded and then reversed in direction while the upper carrier continues its upward movement without interruption. This reversal of the lower carrier is timed to occur as the objective element 12 on the upper carrier approaches the image field of the eyepiece 10. For this purpose the anchorage points of the respective cables 40 and 45 on their respective drums are spaced apart so that the cable 45 is entirely payed out from its drum while a definite length of the cable 40 is still available on the drum 36. Accordingly, continued rotation of the drums results in reversely winding the cable 45 on the drum 35 while still paying out cable from the drum 36. The lower carrier is thus reversed in its movement or, in other words, moved in the same direction as the upper carrier 15 at the maximum focal range of the telescope.

In order to compensate for the increase of the effective length of the cable 45 as the angle at which the cable is payed out from the drum 35 changes during the reversal of the winding of the cable on the drum, a coiled compression spring 55 is interposed between the movable pulley bracket 51 tending to urge the bracket 48 downwardly against the pull of the cable. Thus throughout the major portion of the adjusting operation, the cable 45 is led off from the drum 35 at a relatively steep angle as shown in Fig. 7. The angle gradually increases until the cable extends substantially radially of the drum as shown in Fig. 8 and then decreases as it is wound upon the drum in an opposite direction as shown in Fig. 9. As the anchor point of the cable approaches the position as shown in Fig. 8, the spring 55 shifts the bracket 48 downwardly thus taking up the slack in the cable and maintaining the same taut at all times.

In order to prevent damage to the cable 45 during this change in direction, the end thereof is anchored to the drum by means of a dog 56 pivotally mounted in a slot 57 in the periphery of the drum. The dog is free to swing through a substantial arc as shown in Figs. 7–9 thus eliminating abrupt bending of the cable which would tend to decrease its useful life.

Initial adjustment of the focusing mechanism is extremely simple. The frame structure and assembled parts are removed from the housing as a unit for this purpose. With the cable drums set in the positions shown in Fig. 8, the lens carriers are shifted manually to their correct positions and the cables are attached thereto by closing the clamps 45' and 52. The unit assembly is then inserted in the housing ready for use.

Rotation of the shaft 37 in a clockwise direction (as viewed in Fig. 3) is effective to shift the carriers in directions opposite to those above described, thus with the telescope focused for its extreme range, initial rotation of the shaft is effective to shift both carriers simultaneously away from the eyepiece. This movement in the same direction continues only until the anchorage point of the cable 45 passes the center line of the drum and thereafter the carriers are moved toward each other but at the differential rate described. Such movement continues until interrupted by engagement of the carrier sleeves 18 with the pulley supporting bracket.

It will be apparent from the foregoing that the invention provides a telescope and focusing mechanism therefor of novel and improved construction. By utilizing a double objective together with the novel focusing mechanism arranged to differentially shift the elements of the objective, the degree of magnification is increased as the distance of the object from the telescope increases, while the object field remains substantially constant. The telescope may thus be utilized for reading relatively fine vernier scales such as those provided on machine tools.

The improved telescope is simple in construction and relatively inexpensive to build. Moreover, it is completely enclosed in a rugged casing so that all moving parts and optical elements are effectually protected from dirt and moisture.

We claim as our invention:

1. A telescope having, in combination, an elongated rigid frame, an eyepiece stationarily supported at one end of said frame, an objective including a pair of optical elements, a pair of carriers supporting said elements for independent movement along the common optical axis of the eyepiece and the elements, focusing mechanism operable to shift said carriers differentially to focus the telescope on objects at different distances therefrom, said focusing mechanism comprising a shaft rotatably supported on the frame intermediate the ends thereof, a pair of drums fixed on said shaft, a second shaft rotatably supported on the frame adjacent said first shaft, a pair of guide pulleys mounted on said second shaft, guide pulleys rotatably supported adjacent the ends of the frame, a cable wound on one of said drums and running over one of the guide pulleys of the pair and the guide pulley at said one end of the frame, a second cable wound on the other of said drums and running over the other guide pulley of the pair and the guide pulley at the other end of the frame, said guide pulleys being positioned to direct one run of each cable in a straight line substantially parallel to the path of one of the carriers, and means detachably connecting each cable to one of the carriers within the straight section defined by the guide pulleys.

2. A telescope having, in combination, an elongated rigid frame, an eyepiece stationarily supported at one end of said frame, an objective including a pair of optical elements, a pair of carriers supporting said elements for independent movement along the common optical axis of the eyepiece and the elements, focusing mechanism operable to shift said carriers differentially to focus the telescope on objects at different distances therefrom, said focusing mechanism comprising a shaft rotatably supported on the frame intermediate the ends thereof, a pair of drums fixed on said shaft, cables wound on said drums and operatively connected to the respective carriers, and guide pulleys rotatably supported on the frame in positions effective to direct one run of each cable in a straight line parallel to the path of the associated carrier, one of said guide pulleys being mounted for limited movement parallel to the path of the carrier, and spring means yieldably urging said one guide pulley in a direction effective to take up slack in the cable running thereover.

3. A telescope having, in combination, an elongated rigid frame, an eyepiece stationarily supported at one end of the frame, an objective including a pair of objectives supported for independent movement along their common optical axis, focusing mechanism operable to shift said elements so as to vary the focal length of the combined elements while maintaining the image plane of the elements in fixed relation to the eyepiece, said mechanism including a pair of drums of different diameter fixed on a common shaft, cables wound on said drums and operatively connected with the respective elements, and guide pulleys directing said cables in straight runs parallel to the paths of the respective elements.

4. A telescope having, in combination, a rigid frame including end members connected by parallel guide members, an optical element stationarily supported on one end member, a pair of carriers mounted on said guide members for independent movement, an optical element mounted on each carrier, the other of said end members having a viewing window alined on the optical axis of said elements, focusing mechanism including a shaft disposed transversely of the optical axis of the elements and rotatably supported on said guide members, a pair of drums fixed on said shaft, cables wound on said drums and operatively connected to the respective carriers so as to shift the carriers toward or away from each other in response to rotation of the drums in one direction or the other, and manually operable means for rotating said shaft and said drums.

5. A telescope having, in combination, an eyepiece, an objective including a pair of independently movable optical elements, focusing mechanism operable to shift said elements differentially comprising a shaft, a pair of drums of different diameters fixed on said shaft, cables anchored to the drums and operatively connected with the respective elements, said cables being wound around the drums and led off to the elements so that upon rotation of the shaft in one direction the elements are initially moved away from each other and then moved together in the same direction.

6. A telescope having, in combination, a rigid frame including end members connected by parallel guide members, an optical element stationarily supported on one end member, a pair of carriers mounted on said guide members for independent movement, an optical element mounted on each carrier, focusing mechanism including a pair of drums fixed on a common shaft, and cables anchored to said drums and to the respective carriers, said cables being wound around the drums so that rotation of the shaft in one direction is effective to shift the carriers first in opposite directions and then in the same direction.

7. A telescope having, in combination, a rigid frame including top and bottom members connected by parallel guide members, an optical element stationarily supported on the top member, a pair of carriers mounted on said guide members for independent movement, an optical element mounted on each carrier, focusing mechanism including a pair of drums fixed on a common shaft, and cables wound on said drums and operatively connected to the respective carriers, said drums being of different diameters whereby one of said carriers is shifted through a greater range than the other carrier.

ERWIN J. KAISER.
JOSEPH DAUBER.

REFERENCES CITED

The following references are of record in the file of this patent:

UNITED STATES PATENTS

| Number | Name | Date |
|---|---|---|
| 2,277,065 | Bock | Mar. 24, 1942 |
| 2,042,815 | White | June 2, 1936 |
| 715,793 | Harvey | Dec. 16, 1902 |
| 737,872 | Saegmuller | Sept. 1, 1903 |
| 1,091,933 | Humbrecht | Mar. 31, 1914 |
| 1,505,878 | Erfle | Aug. 19, 1924 |
| 2,171,360 | Strang | Aug. 29, 1939 |
| 2,179,850 | Glancy | Nov. 14, 1939 |
| 1,988,390 | Naumann | Jan. 15, 1935 |

FOREIGN PATENTS

| Number | Country | Date |
|---|---|---|
| 322,460 | British | Dec. 4, 1929 |
| 16,766 | British | Nov. 29, 1915 |